United States Patent
Chen

(10) Patent No.: US 8,556,055 B2
(45) Date of Patent: Oct. 15, 2013

(54) DRIVING APPARATUS FOR REAR HUB OF BICYCLE

(75) Inventor: Ching-Shu Chen, Changhua (TW)

(73) Assignee: Chosen Co. Ltd., Changhua (TW)

( * ) Notice: Subject to any disclaimer, the term of this patent is extended or adjusted under 35 U.S.C. 154(b) by 100 days.

(21) Appl. No.: 13/227,197

(22) Filed: Sep. 7, 2011

(65) Prior Publication Data

US 2013/0056320 A1     Mar. 7, 2013

(51) Int. Cl.
  *B60B 27/02* (2006.01)
  *F16D 15/00* (2006.01)

(52) U.S. Cl.
  USPC .............................. 192/64; 301/110.5; 192/46

(58) Field of Classification Search
  USPC ........................................................... 192/64
  See application file for complete search history.

(56) References Cited

U.S. PATENT DOCUMENTS

| | | | | |
|---|---|---|---|---|
| 2,143,121 A | * | 1/1939 | Cox ............................. | 192/43.1 |
| 4,147,226 A | * | 4/1979 | Kleespies et al. ............ | 180/385 |
| 6,202,813 B1 | * | 3/2001 | Yahata et al. ................ | 192/64 |
| 2008/0315679 A1 | * | 12/2008 | Shook ........................ | 301/110.5 |
| 2009/0230758 A1 | * | 9/2009 | Schneider et al. ......... | 301/110.5 |
| 2011/0214961 A1 | * | 9/2011 | Chen ............................ | 192/64 |

FOREIGN PATENT DOCUMENTS

GB         451299      *   8/1936

* cited by examiner

*Primary Examiner* — David D Le
*Assistant Examiner* — Mark Manley
(74) *Attorney, Agent, or Firm* — Che-Yang Chen; Law Office of Michael Chen

(57) ABSTRACT

A driving apparatus for a rear hub of a bicycle includes a hub shell, a single-directional driving component and a dual-directional driving component, wherein the single-directional driving component has a ratchet ring and a ratchet base, and a plurality of inclined helical surfaces are located around an inner perimeter of the ratchet ring, and a plurality of engaging ribs that engage with the wedging ribs of the fixed ring of the hub shell are located around an outer perimeter of the ratchet ring. A plurality of conjugating portions are located around an outer perimeter at one end of the ratchet base to form a resilient unit and a hook against the inclined helical surface. A plurality of conjugating ribs are located around one end of the dual-directional driving component, and the conjugating ribs are used to engage with the wedging ribs of the fixed ring of the hub shell.

9 Claims, 14 Drawing Sheets

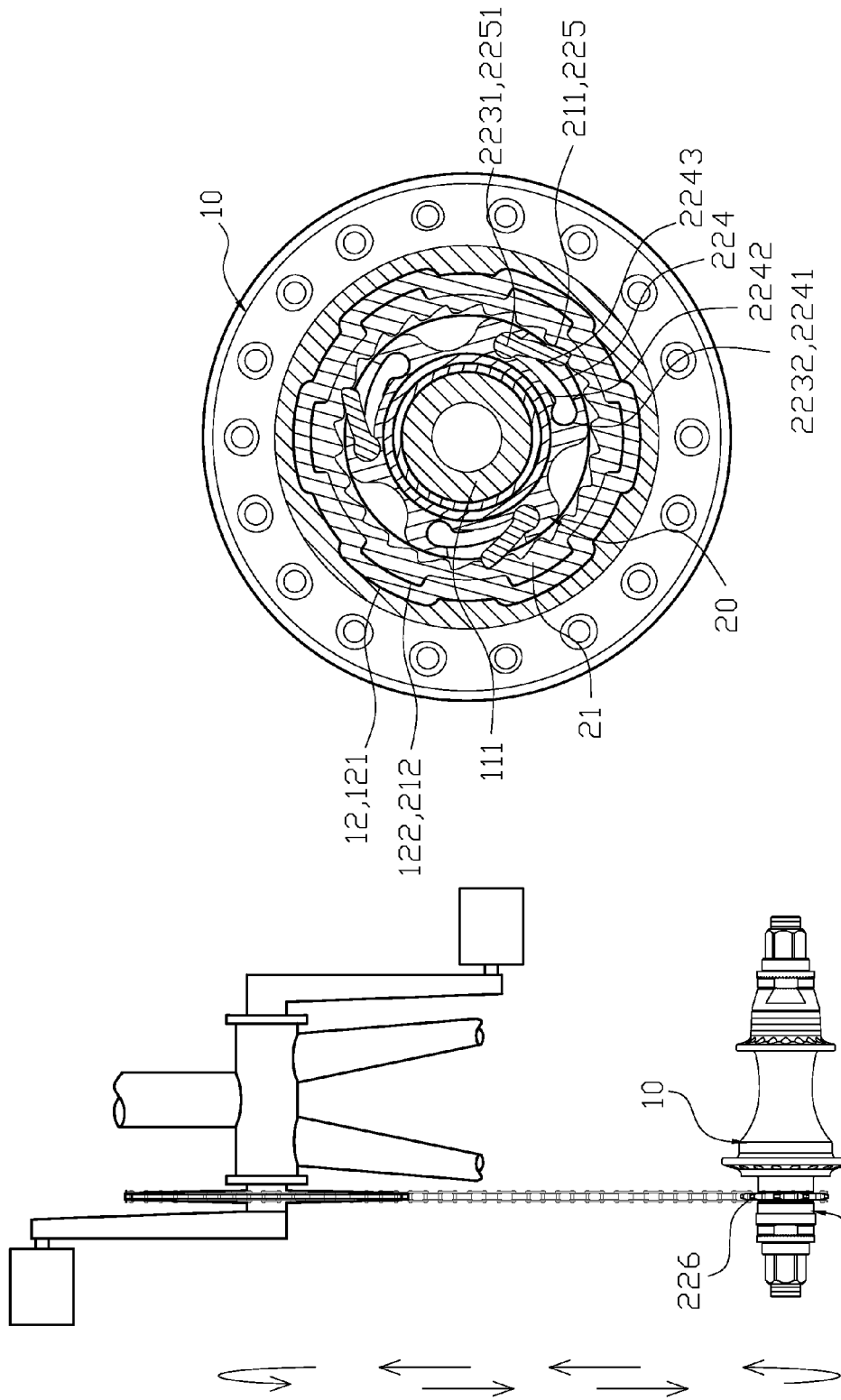

DRIVING APPARATUS FOR REAR HUB OF BICYCLE

FIELD OF THE INVENTION

The present invention is related to a driving apparatus of a bicycle's rear hub, and more specifically to a combination of a ratchet ring and a ratchet base of a single-directional driving component that can be used in a bicycle chain either on left or right side. Moreover, the structure can be driven by either single-directional or dual-directional according to the requirement of the user to increase the applicability of the hub, so that the species of the product can be reduced and further reduce the number of inventory to achieve the goal of cost reduction.

BACKGROUND OF THE INVENTION

A conventional rear hub driving apparatus for a bicycle, as shown in FIGS. 15 and 16, includes a hub shell (40) and a ratchet plate (50), wherein the hub shell has a receiving space (41) having a shaft (42) passing through, and the shaft (42) has locking unit (421) on both ends. The receiving space (41) has a fixed base (43) at an inner perimeter thereof, and the fixed base (43) has a plurality of protruding ribs (431) located around an inner perimeter to engage an action ring (44) that has a plurality of square wedging slots (441) at an inner perimeter. The ratchet plate (50) has a tooth plate (51) and a ratchet base (52) on each side for a chain, wherein the ratchet base (52) is located at the receiving space (41), and the ratchet base (52) has a plurality of engaging slots (53) at an outer perimeter that has a spring (531) and a ratchet (532). The spring (531) is against an inner portion of the ratchet (532), so that the ratchet (532) is against the wedging slot (441) of the action ring (44). When the bicycle moves forward to drive the ratchet plate (50), the ratchet (532) is against the wedging slot (441) of the action ring (44) to drive the hub shell (40) to rotate. When the ratchet plate (50) stops rotating, the ratchet (532) detaches from the wedging slot (441) and presses the spring (531), so that the status between the hub shell (40) and the ratchet plate (50) can be switched when the user pedals. According to different riding habits, when the user may want to switch the chain from right to left side, the user can swap the spring (531) and ratchet (532) in the engaging slot (53) of the ratchet base (52) to obtain a bicycle with the chain on the left side.

Some disadvantages in the abovementioned conventional structure can be summarized as following:

(a) The ratchet (532) is pushed by the spring (531) to be against the wedging slot (441) of the action ring (44) to drive the hub shell (40) to rotate, and the wedging slot (441) of the action ring (44) is square, so the contact area of the ratchet (532) is too small, which may lead to insufficient structural strength.

(b) The wedging lot (441) of the action ring (44) is square to increase the contacting height of the ratchet (532), namely enlarging the volume of the action ring (44), which may increase the swing magnitude of the ratchet (532) on the action ring (44) and reduce the flexibility thereof.

(c) The action ring (44) is located at the fixed base (43) of the hub shell (40), and axially positioned through the inner wall of the hub shell (40) and the ratchet plate (50). However, there is still a gap between the action ring (44) and the ratchet plate (50), so that the action ring (44) still has some room for axial movement that may cause wear between the ratchet plate (50) and action ring (44) to reduce durability of the structure of the hub shell.

(d) The single-directional driving style is only suitable for regular bicycles, but not suitable for performing stunts that may need to drive the tires going back and forth simultaneously. Thus, the cost for purchasing the bicycle is higher. Moreover, since the hub shell has low applicability, the manufacturer has to produce different kinds of hub shells and corresponding components, so the manufacturing costs can be higher and more inventory can be expected. Therefore, there is a need for a new and improved hub shell structure for the bicycle to overcome abovementioned disadvantages.

SUMMARY OF THE INVENTION

The technical problem to be solved in the present invention:

(a) The ratchet is pushed by the spring to be against the wedging slot of the action ring to drive the hub shell to rotate, and the wedging slot of the action ring is square, so the contacting area of the ratchet is too small, which may lead to insufficient structural strength.

(b) The wedging lot of the action ring is square to increase the contacting height of the ratchet, namely enlarging the volume of the action ring, which may increase the swing magnitude of the ratchet on the action ring and reduce the flexibility thereof.

(c) The action ring is located at the fixed base of the hub shell, and axially positioned through the inner wall of the hub shell and the ratchet plate. However, there is still a gap between the action ring and the ratchet plate, so that the action ring still has some room for axial movement that may cause wear between the ratchet plate and action ring to reduce durability of the structure of the hub shell.

(d) The single-directional driving style is only suitable for regular bicycles, but not suitable for performing stunts that may need to drive the tires going back and forth simultaneously. Thus, the cost for purchasing the bicycle is higher. Moreover, since the hub shell has low applicability, the manufacturer has to produce different kinds of hub shells and corresponding components, so the manufacturing costs can be higher and more inventory can be expected. Therefore, there is a need for a new and improved hub shell structure for the bicycle to overcome abovementioned disadvantages.

The present invention provides a driving apparatus for a rear hub of a bicycle including a hub shell that has a receiving space formed at one side of the hub shell, and the receiving space has a shaft passing therethrough. The shaft has a thread section provided for a locking unit, and a plurality of wedging slot located around an inner perimeter of the receiving space. A fixed ring is configured to tightly engage with the wedging slot and has a plurality of wedging ribs located at an inner perimeter thereof. A stopping edge and a wedging groove are formed inside and outside the wedging slot, wherein the stopping edge is formed for a bearing that is passed through by the shaft, and a stopping unit is formed on the side of the bearing and used to secure the bearing. The wedging groove is provided for a restricting unit. The driving apparatus also has a single-directional driving component having a ratchet ring and a ratchet base, wherein the ratchet ring has a plurality of single-directional inclined helical surfaces formed around an inner perimeter of the ratchet ring, while a plurality of engaging ribs are formed around an outside perimeter of the ratchet ring, and the engaging ribs are engaged with the wedging ribs of the fixed ring of the hub shell. The ratchet base has a through hole through the axial direction and the through hole has a shaft-receiving unit for the shaft of the hub shell. The ratchet base has a plurality of conjugating portions located around an outer perimeter at one end thereof, and a first conjugating slot is axially and recessedly formed on one side of the conjugating portion, while a second conjugating slot that is facing the first conjugating slot is axially and recessedly formed on the other side of the conjugating portion. Each of the first conjugating slot and the second conjugating slot provides a resilient unit and a hook, wherein the resilient unit is against the inner portion of the hook and the hook is against the inclined helical surface of the ratchet ring. One end of the hook has a rotating portion and the other end of the ratchet base has a tooth plate. The driving apparatus also has a dual-directional driving base that has a penetrating hole for the shaft of the hub shell. One end of the dual-directional driving base has a plurality of conjugating ribs to engage with the wedging ribs of the fixed ring of the hub shell. The other end of the dual-directional driving base has a second tooth plate. Based on the abovementioned structure, the driving apparatus of the rear hub of the bicycle is formed.

Comparing with conventional techniques, the present invention has the following advantages:

(a) By switching the chain from one side to the other, the present invention can be used in the bicycle with the chain on the left and right sides. Since the hook is against the inclined helical surface of the ratchet ring, the hook has larger contact area to further reinforce the structure to increase the durability.

(b) The ratchet ring has the inclined helical surface inclining to one direction, and the inclined helical surface engages with the hook of the ratchet base to lower the contacting height of the inclined helical surface and reduce the volume of the ratchet ring. Namely the swing magnitude of the hook is reduced to increase its flexibility.

(c) Since the fixed ring and ratchet ring are located between the stopping unit and restricting unit, the axial sliding of the fixed ring and the ratchet ring can be prevented to reduce axial wear and collision, and further reduce the rotation resistance of the single-directional driving component and increase its durability.

(d) Since the hub shell can be switched to either single-directional or dual-directional driving according to the user's desire, the applicability of the hub shell is increased. Thus, the species of produces are lowered to reduce inventory and further achieve the goal of cost reduction.

BRIEF DESCRIPTION OF THE DRAWINGS

FIG. 8 illustrates a schematic view of the first embodiment on the left side of the bicycle body in the present invention.

FIG. 9 illustrates a sectional view of the first embodiment on the left side of the bicycle body in the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
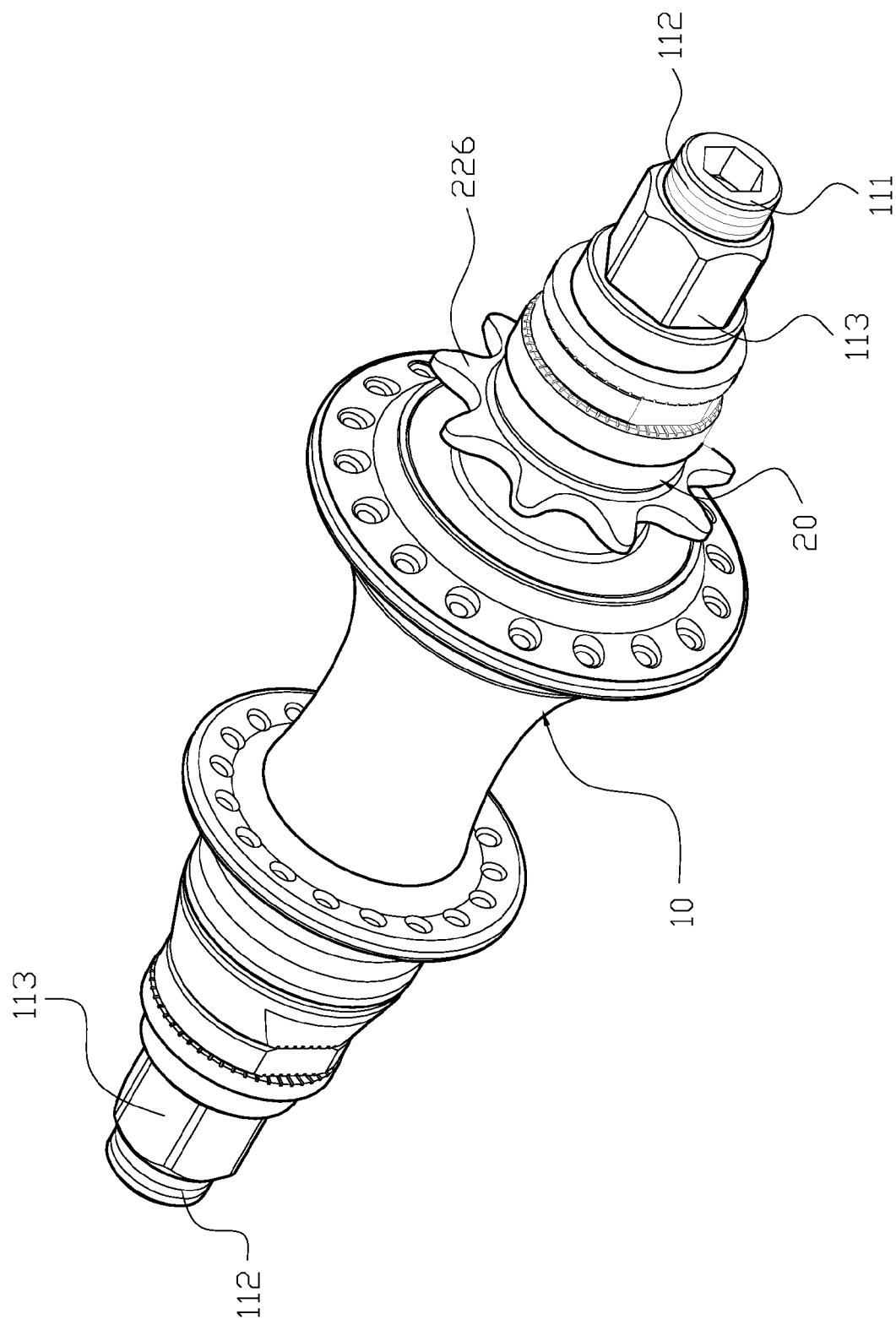
FIG. 1 illustrates a three-dimensional assembled view in the present invention.
Figure 2:
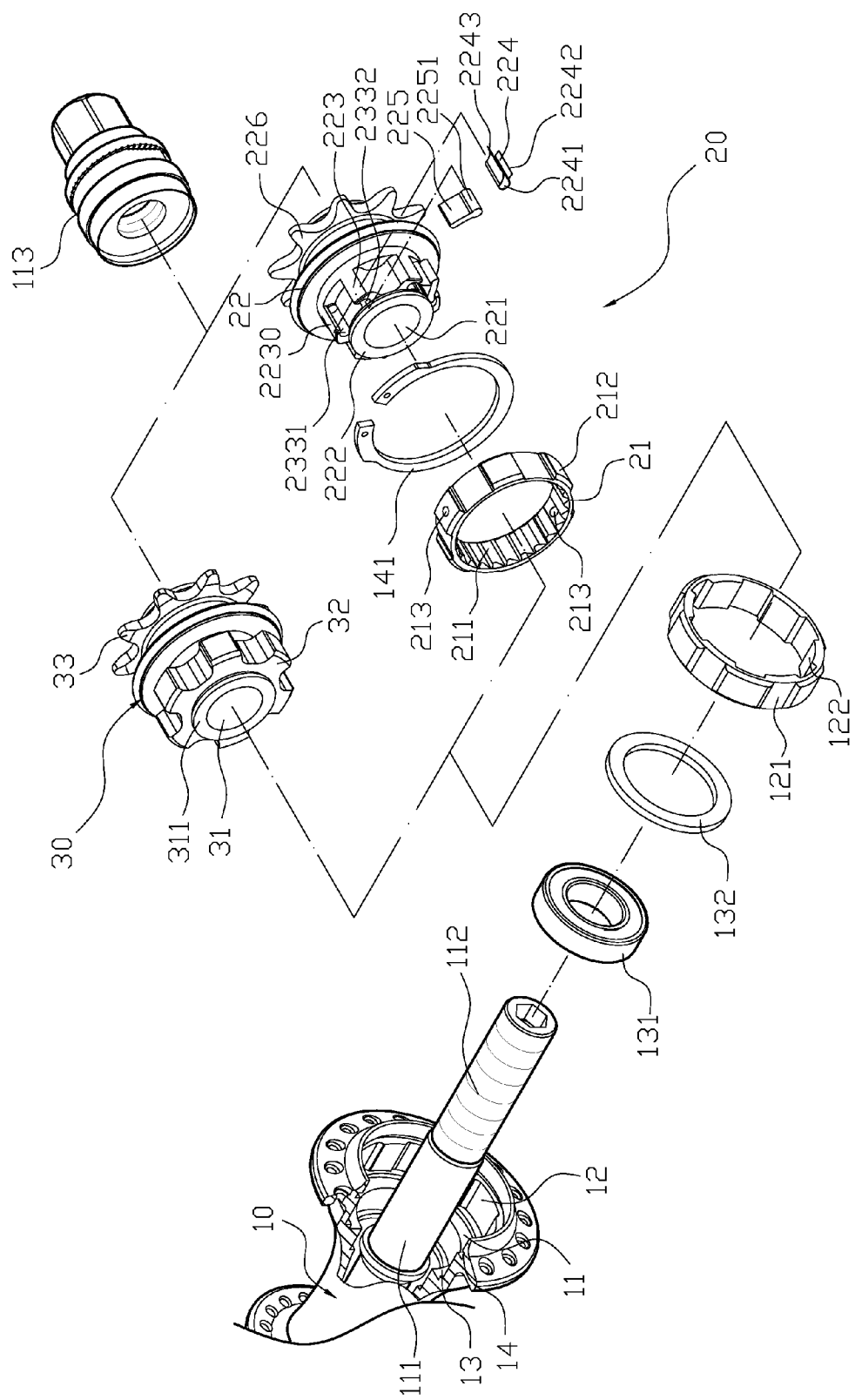
FIG. 2 illustrates a three-dimensional exploded view in the present invention

In order to further understand the goal, characteristics and effect of the present invention, a number of embodiments along with the drawings are illustrated as following:

Referring to FIGS. 1 to 2, a driving apparatus for a back hub of a bicycle includes a hub shell (10), a single-directional driving component (20) and a dual-directional driving base (30), wherein a receiving space (11) is formed at one side of the hub shell (10) and the receiving space (11) has a shaft (111) passing therethrough. The shaft (111) has a thread section (112) provided for a locking unit (113), and a plurality of wedging slot (12) located around an inner perimeter of the receiving space (11). A fixed ring (121) is configured to tightly engage with the wedging slot (12) and the fixed ring (121) is made of steel materials to reinforce the structure of the hub shell (10), and a plurality of wedging ribs (122) are located at an inner perimeter of the fix ring (121). A stopping edge (13) and a wedging groove (14) are formed inside and outside the wedging slot (12), wherein the stopping edge (13) is formed for a bearing (131) that is passed through by the shaft (111), and a stopping unit (132) is formed on the side of the bearing and used to secure the bearing. The wedging groove (14) is formed for a restricting unit (141) that is a C-shaped hook. The single-directional driving component (20) has a ratchet ring (21) and a ratchet base (22), wherein the ratchet ring (21) is made of steel materials and a plurality of single-directional inclined helical surfaces (211) are formed around an inner perimeter of the ratchet ring (21). A plurality of engaging ribs (212) are formed around an outside perimeter of the ratchet ring (21), and the engaging ribs (212) are engaged with the wedging ribs (122) of the fixed ring (121) of the hub shell (10). A plurality of tool holes (213) are formed around an inner perimeter of the ratchet ring (21) so some hand tools can be plugged in. The ratchet base (22) has a through hole (221) through the axial direction and the through hole (221) has a shaft-receiving unit (222) for the shaft (111) of the hub shell (10).

The ratchet base (22) has a plurality of conjugating units (223) (2230) facing each other at an outer perimeter of one end, and a concave first conjugating slot (2231) is axially and recessedly formed on one side of the conjugating unit (223), while a second conjugating slot (2232) that is facing the first conjugating slot (2231) is axially and recessedly formed on one side of the conjugating unit (2230). Each of the first conjugating slot (2231) and the second conjugating slot (2232) provides a resilient unit (224) and a hook (225), wherein the resilient unit (224) has an engaging portion (2241) extending to both ends to form a stopping end (2242) and a supporting end (2243), and the stopping end (2242) is against the outer perimeter of the ratchet base (22), while the supporting end (2243) is against an inner portion of the hook (225). The hook (225) is made of steel materials and against the inclined helical surface (211) of the ratchet ring (21), and one end of the hook (225) has a rotating portion (2251). The ratchet base (22) has a tooth plate (226) having a structure of combination of multiple protrudings to achieve the effect of changing speed at the rear tire of the bicycle. The dual-directional driving base (30) has a penetrating hole (31) axially formed that has a second shaft-receiving unit (311) for the shaft (111) of the hub shell (10). The dual-directional driving base (30) has a plurality of conjugating ribs (32) circularly formed on one end that engages with the wedging ribs (122) of the fixed ring (121) of the hub shell (10). The dual-directional driving base (30) has a second tooth plate (33) on the other end that has a structure of combination of multiple protrudings to achieve the effect of changing speed at the rear tire of the bicycle.

Figure 3:
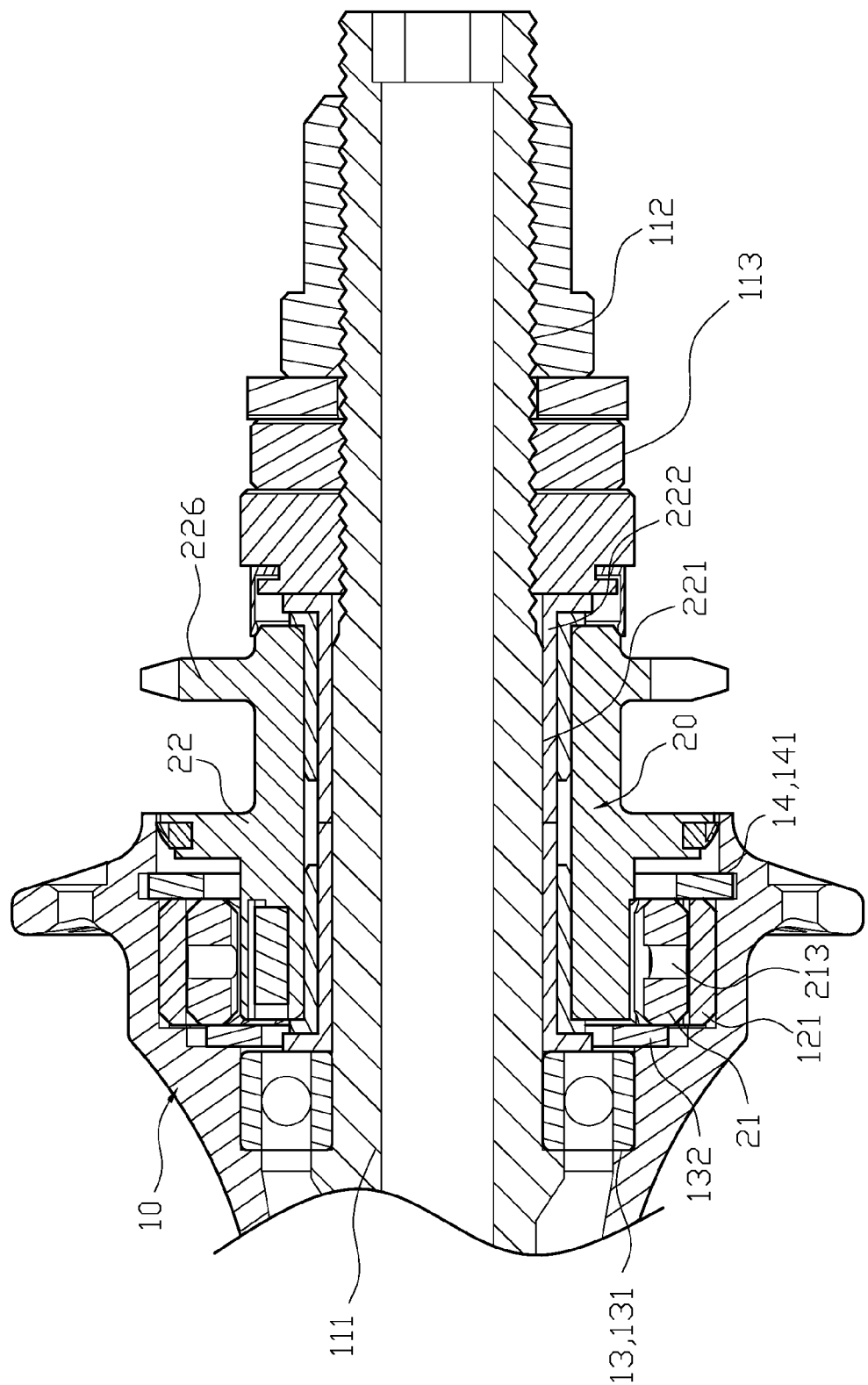
FIG. 3 illustrates a sectional view of a first embodiment in the present invention.

Referring to FIGS. 2 and 3, when a user would like to ride the bicycle, the hub shell (10) engages with the single-directional driving unit (20). More specifically, the engaging ribs (212) of the ratchet ring (21) in the single-directional driving unit (20) correspond and engage with the wedging ribs (122) of the fixed ring (121) of the hub shell (10), and the restricting unit (141) is restricted in the wedging groove (14). Since the fixed ring (121) and the ratchet ring (21) are formed between the stopping unit (132) and the restricting unit (141), the fixed ring (121) and the ratchet ring (21) are prevented from axial sliding and further reduce axial wear and collision. Thus, the rotation resistance of the single-directional driving unit (20) is reduced and the durability thereof is improved. Also, the engaging portion (2241) of the resilient unit (224) and the rotating portion (2251) of the hook (225) are engaged with the first conjugating slot (2231) and second conjugating slot (2232) of the ratchet base (22), so that the stopping end (2242) of the resilient unit (224) is against the outer perimeter of the ratchet base (22) and the supporting end (2243) of the resilient unit (224) is against the inner portion of the hook (225) to complete the assembly of the single-directional driving component. Furthermore, the single-directional driving component (20) is hingedly set up at the shaft (111) of the hub shell (10) through the through hole (221) of the ratchet base (22), and the hook (25) of the ratchet base (22) is against the inclined helical surface (211) of the ratchet ring (21), and the locking unit (113) is locked at the thread section (112) of the shaft (111) to complete the assembly.

Figure 4:
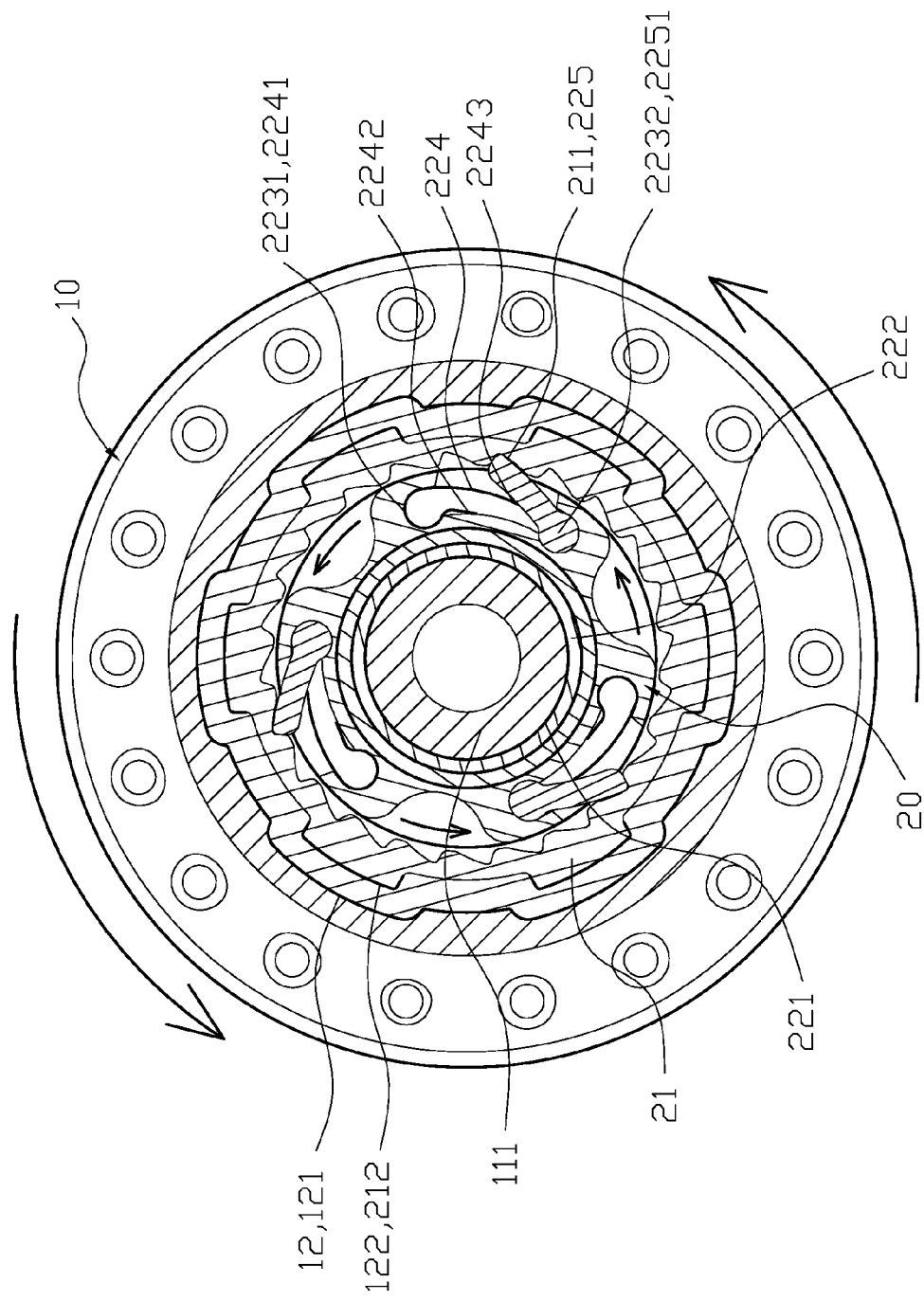
FIG. 4 illustrates a schematic view of the first embodiment in motion in the present invention.
Figure 5:
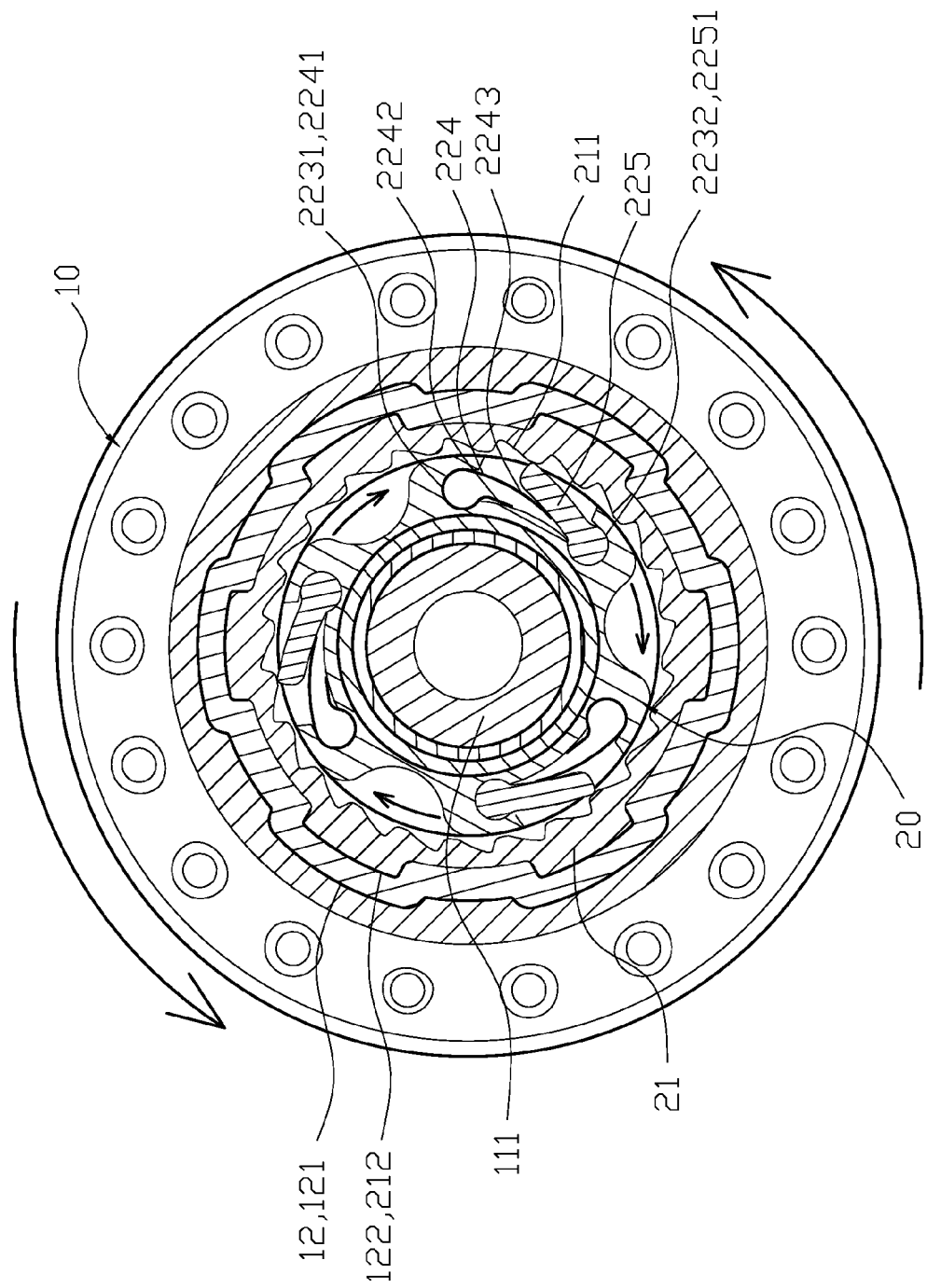
FIG. 5 illustrates a second schematic view of the first embodiment in motion in the present invention.
Figures 6, 7:
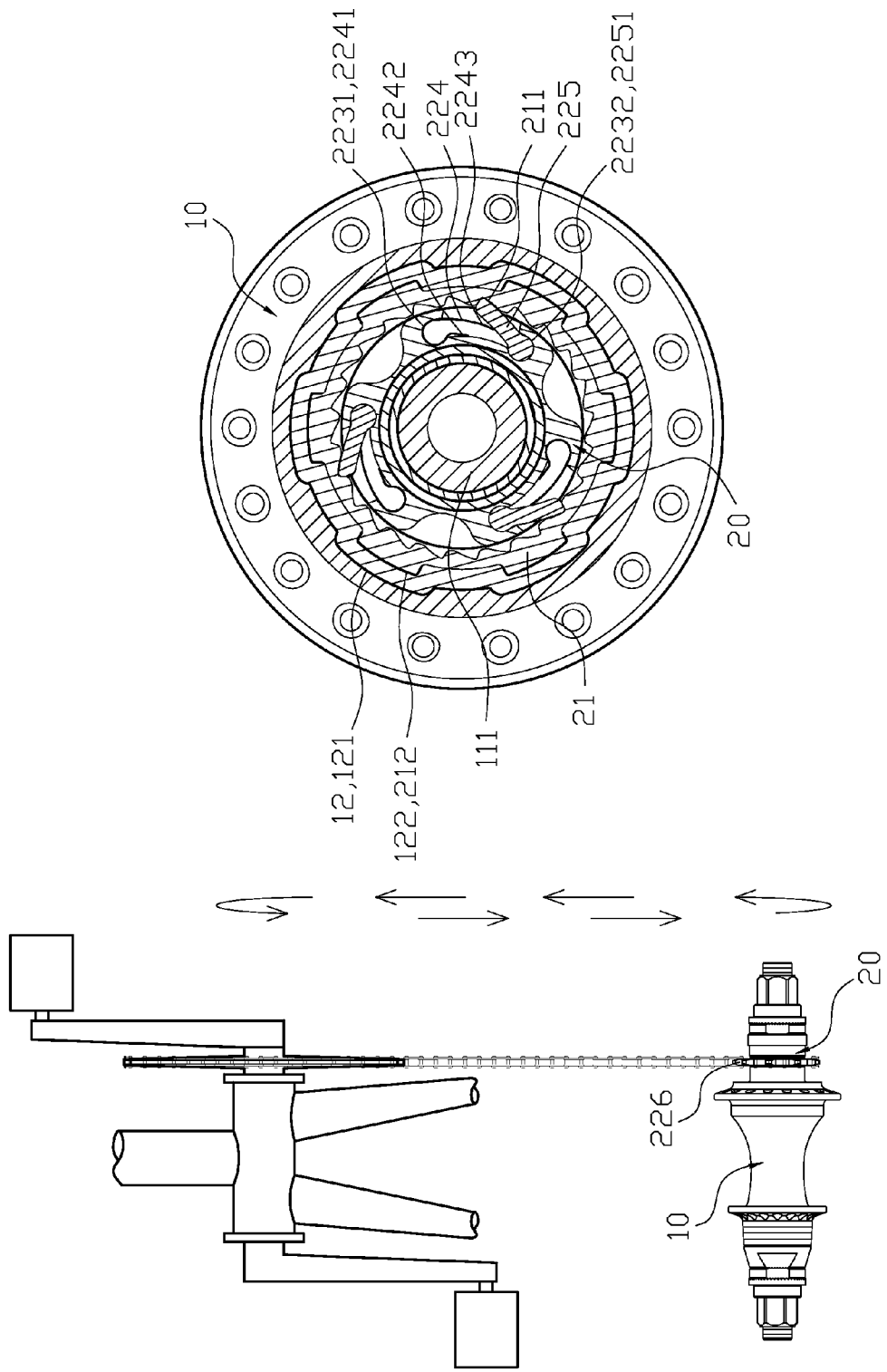
FIG. 6 illustrates a schematic view of the first embodiment on the right side of the bicycle body in the present invention.
FIG. 7 illustrates a sectional view of the first embodiment on the right side of the bicycle body in the present invention.
Figure 10:
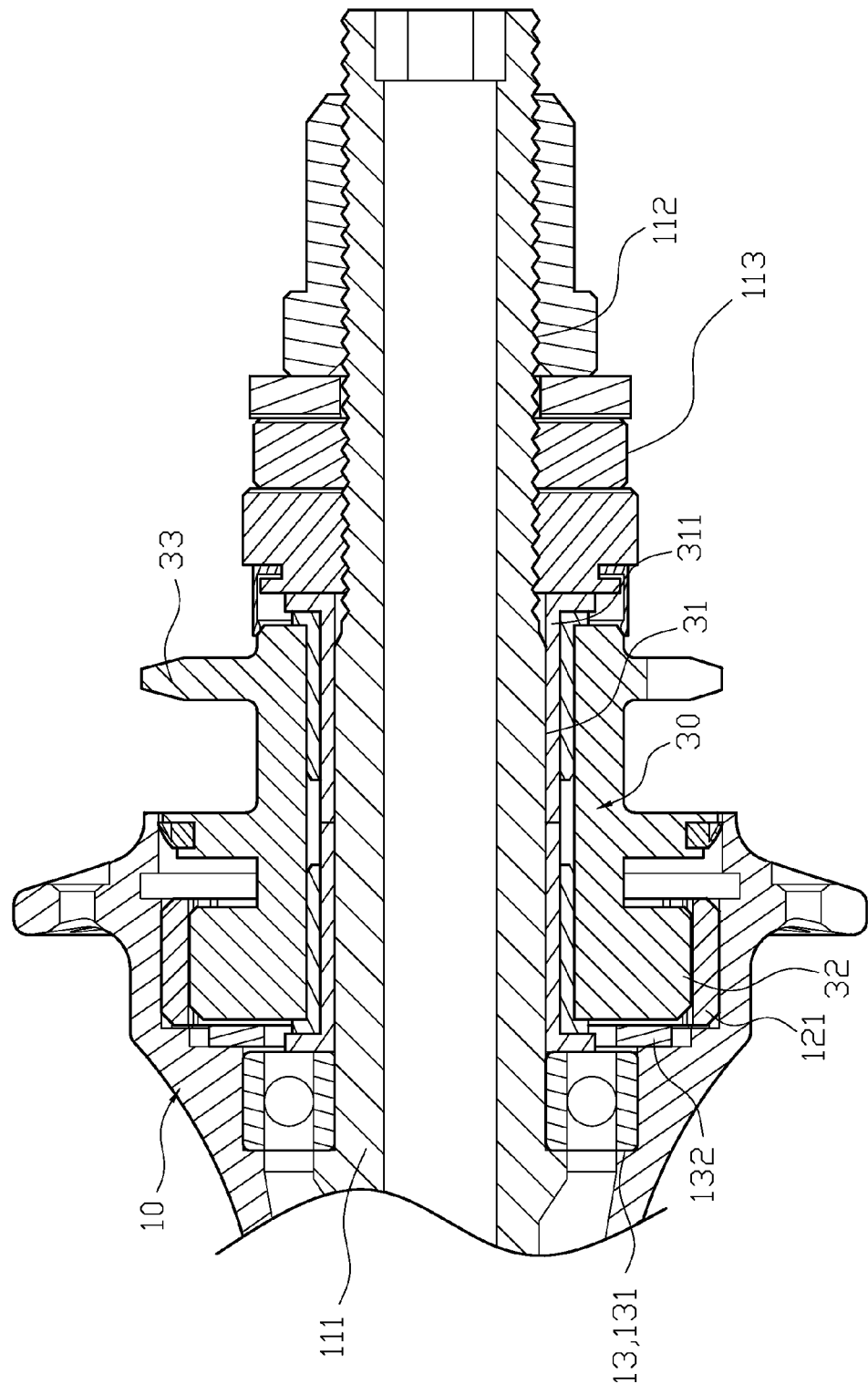
FIG. 10 illustrates a sectional view of a second embodiment in the present invention.

Referring to FIGS. 2 and 4, when the user pedals the bicycle, the chain drives the tooth plate (226) of the ratchet base (22) in the single-directional driving component (20), so the hook (225) is pushed by the resilient unit (224) to be against the inclined helical surface (211) of the ratchet ring (21). Meanwhile, since the engaging ribs (212) of the ratchet ring (21) engage with the wedging ribs (122) of the hub shell (10) to simultaneously drive the hub shell (10) through the ratchet ring (21). When the user stops pedaling, the hook (225) is pushed by the end of the inclined helical surface (211) of the ratchet ring (21), the hook (225) moves toward the resilient unit (224) with the rotating portion (2251) as a pivot, so that the hub shell (10) and the ratchet base (22) are separated (see FIG. 5), and the hub shell (10) is driven in single direction.

FIGS. 1 to 7 illustrate the status of installing the ratchet base (22) on the bicycle having a chain on the right side. According to the assembly method described above, the resilient unit (224) is set at the first conjugating slot (2231) and the hook (225) is at the second conjugating slot (2232). When the bicycle moves forward, the hook (225) is against the inclined helical surface (211) of the ratchet ring (21) to drive the bicycle. When the driver wants to switch the chain from one side to the other, as can be seen in FIGS. 8 and 9, the ratchet ring (21) is disposed into the hub shell (10) and the engaging ribs (212) of the ratchet ring (21) engage with the wedging ribs (122) of the hub shell (10), so that the inclined helical surface (211) of the ratchet ring (21) can be inclined at the other direction. Moreover, the resilient unit (224) in the first conjugating slot (2231) and the hook (225) in the second conjugating slot (2232) are switched when the bicycle has the chain on the left side. Namely, the resilient unit (224) is now in the second conjugating slot (2232), while the hook (225) is in the first conjugating slot (2231). With the change during assembly process, the bicycle can be driven as the chain is on the right side, so as to achieve the goal of applying the hub shell (10) in the bicycle with the chain on both left and right sides.

Figure 11:
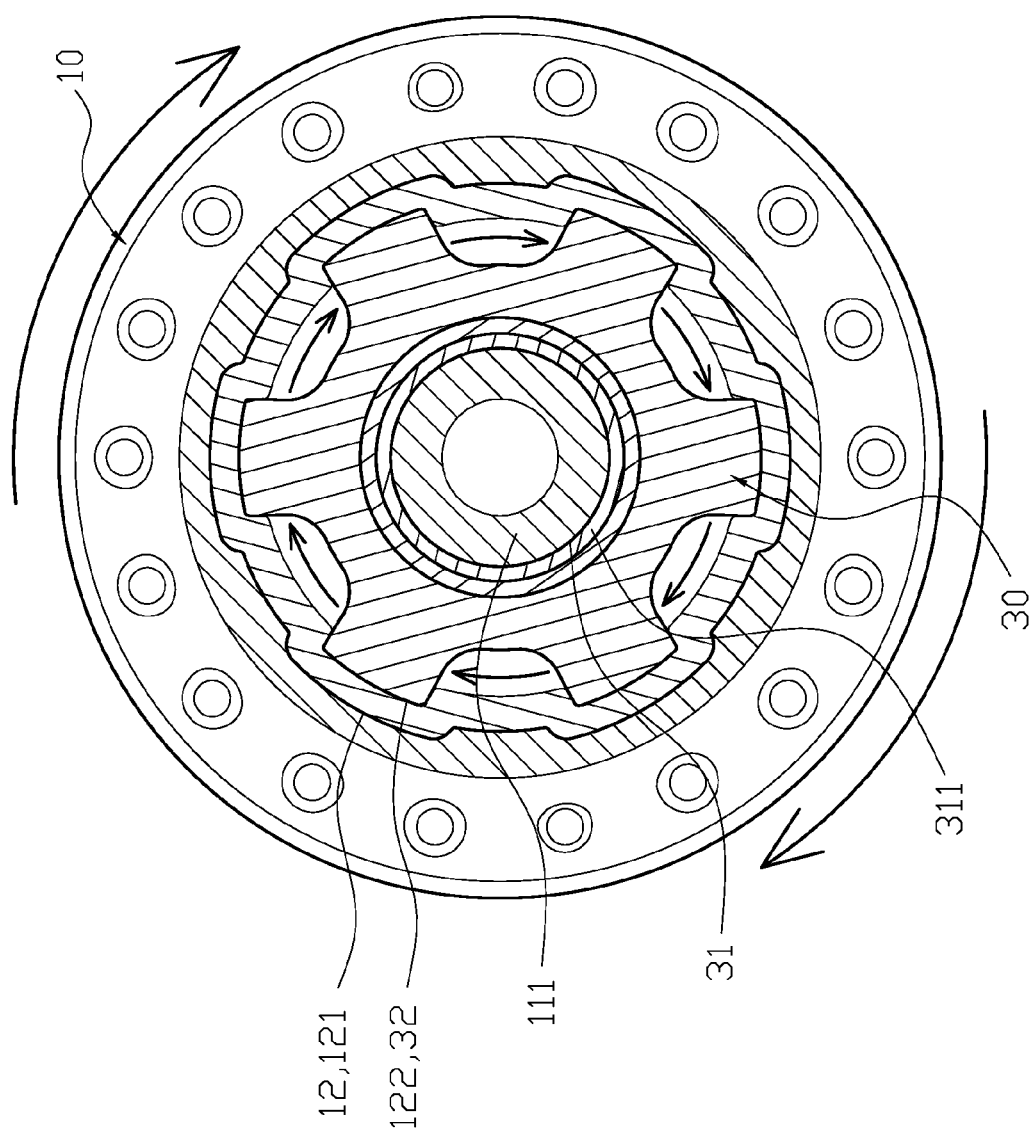
FIG. 11 illustrates a schematic view of the second embodiment in motion in the present invention.
Figure 12:
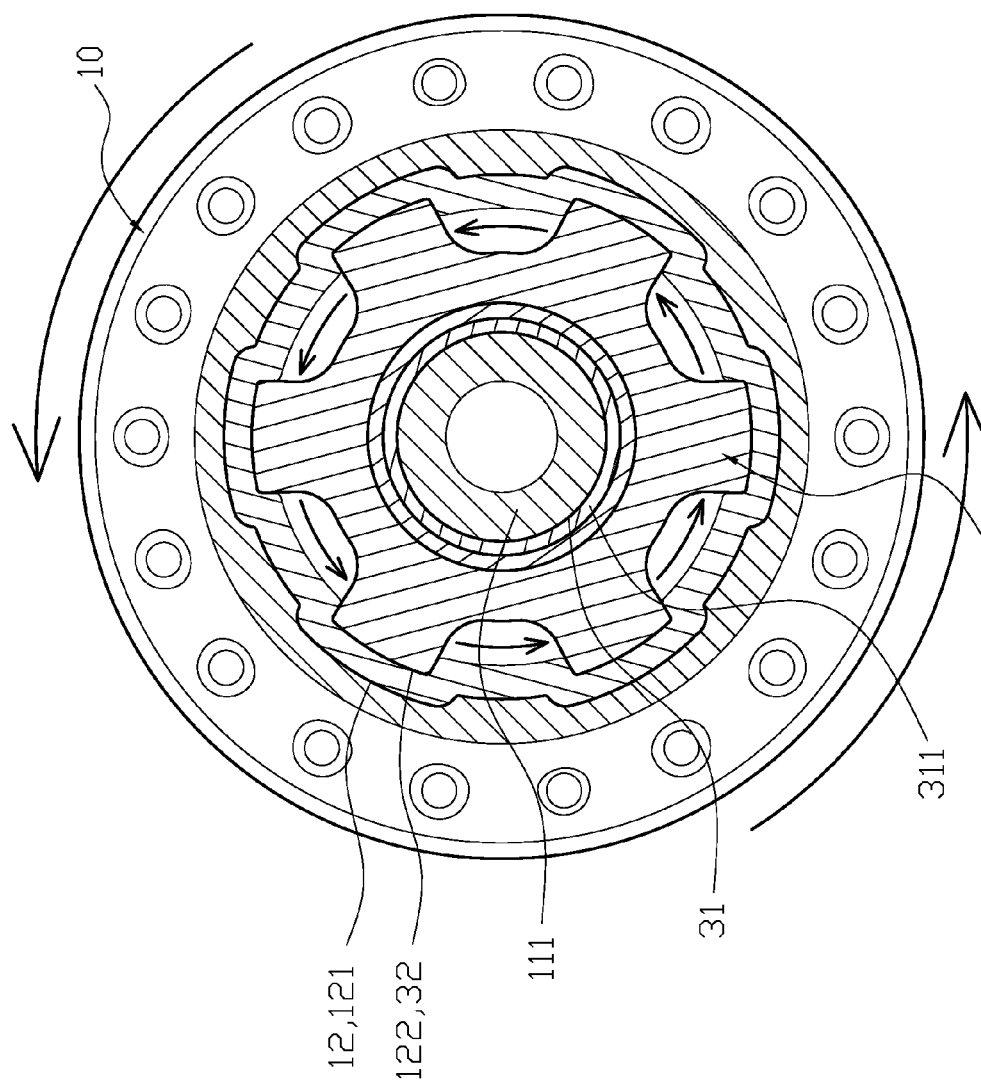
FIG. 12 illustrates a second schematic view of the second embodiment in motion in the present invention.

FIGS. 1 to 9 illustrate the status of installing the single-directional driving component (20) on the hub shell (10) to achieve the goal of driving the hub shell (10) in a single direction. When the user want to perform riding stunts, the original single-direction driving can be changed to dual-directional driving. FIGS. 2 to 10 illustrate the status of installing the dual-directional driving base (30) on the shell hub (10). The dual-directional driving base (30) is hingedly secured at the shaft (111) of the hub shell (10) through the penetrating hole (31), and the conjugating ribs (32) of the dual-directional driving base (30) engage with the wedging ribs (122) of the fixed ring (121) of the hub shell (10), and the locking unit (113) is locked at the thread section (112) of the shaft (111) to form a secured position and complete the assembly. When the user pedals the bicycle, the chain drives the second tooth plate (33) of the dual-directional driving base (30) to rotate. Since the conjugating ribs (32) of the dual-directional driving base (30) directly engage with the wedging ribs (122) of the fixed ring (121) of the hub shell (10), the dual-directional driving base (30) can drive the tires to rotate forward and backward, no matter which direction the dual-directional driving base (30) rotates (see FIGS. 11 and 12), which can not be achieved by a regular bicycle. Since the hub shell (10) can be switched to either single-directional or dual-directional according to the user's desire, the applicability of the hub shell (10) is increased. Thus, the species of product can be reduced to lower the amount of inventory to further achieve the goal of cost reduction.

Figure 13:
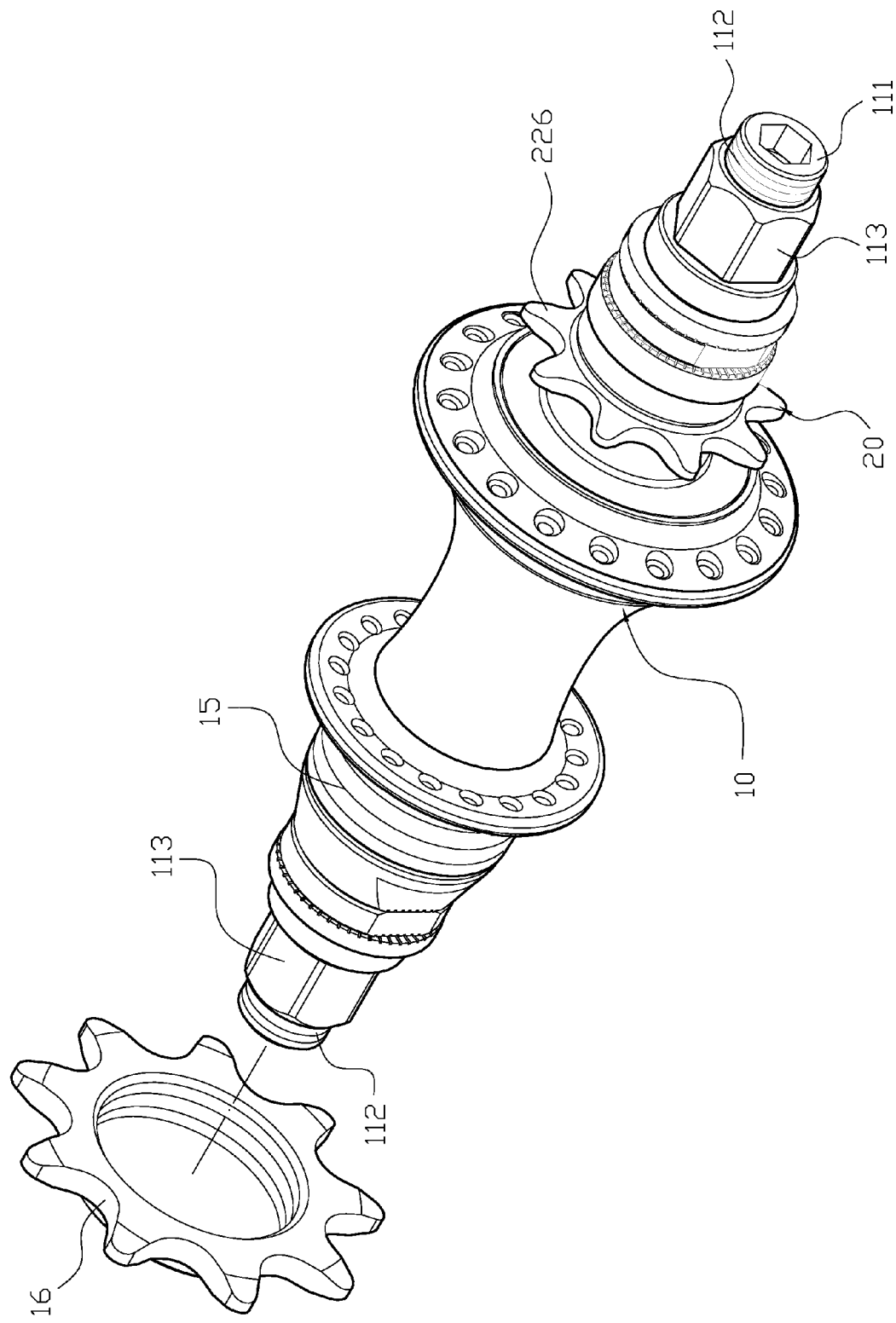
FIG. 13 shows an exploded view of another embodiment in the present invention.
Figure 14:
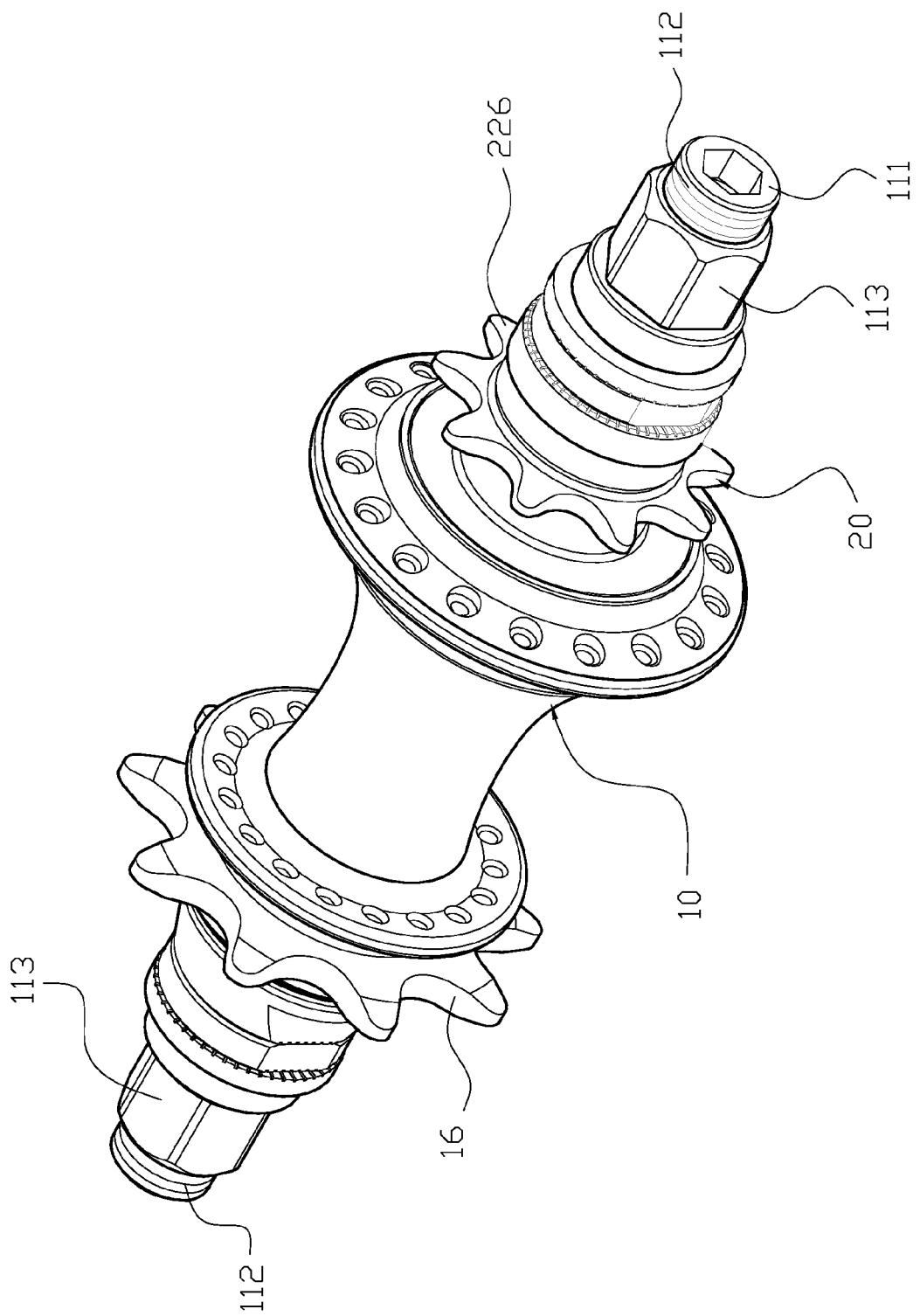
FIG. 14 shows a three-dimensional assembled view of another embodiment in the present invention.
Figure 15:
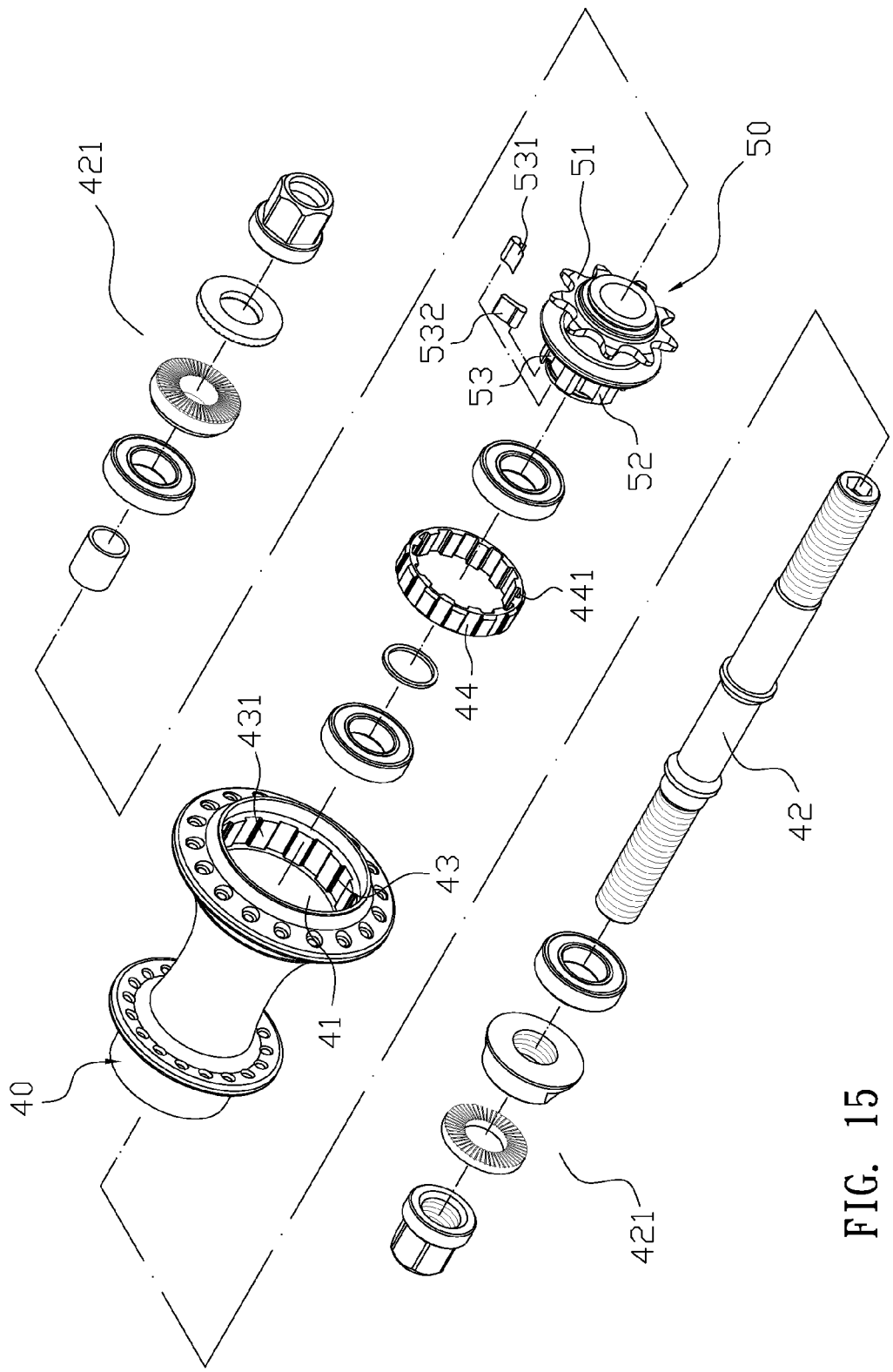
FIG. 15 is a three-dimensional exploded view of a prior art.
Figure 16:
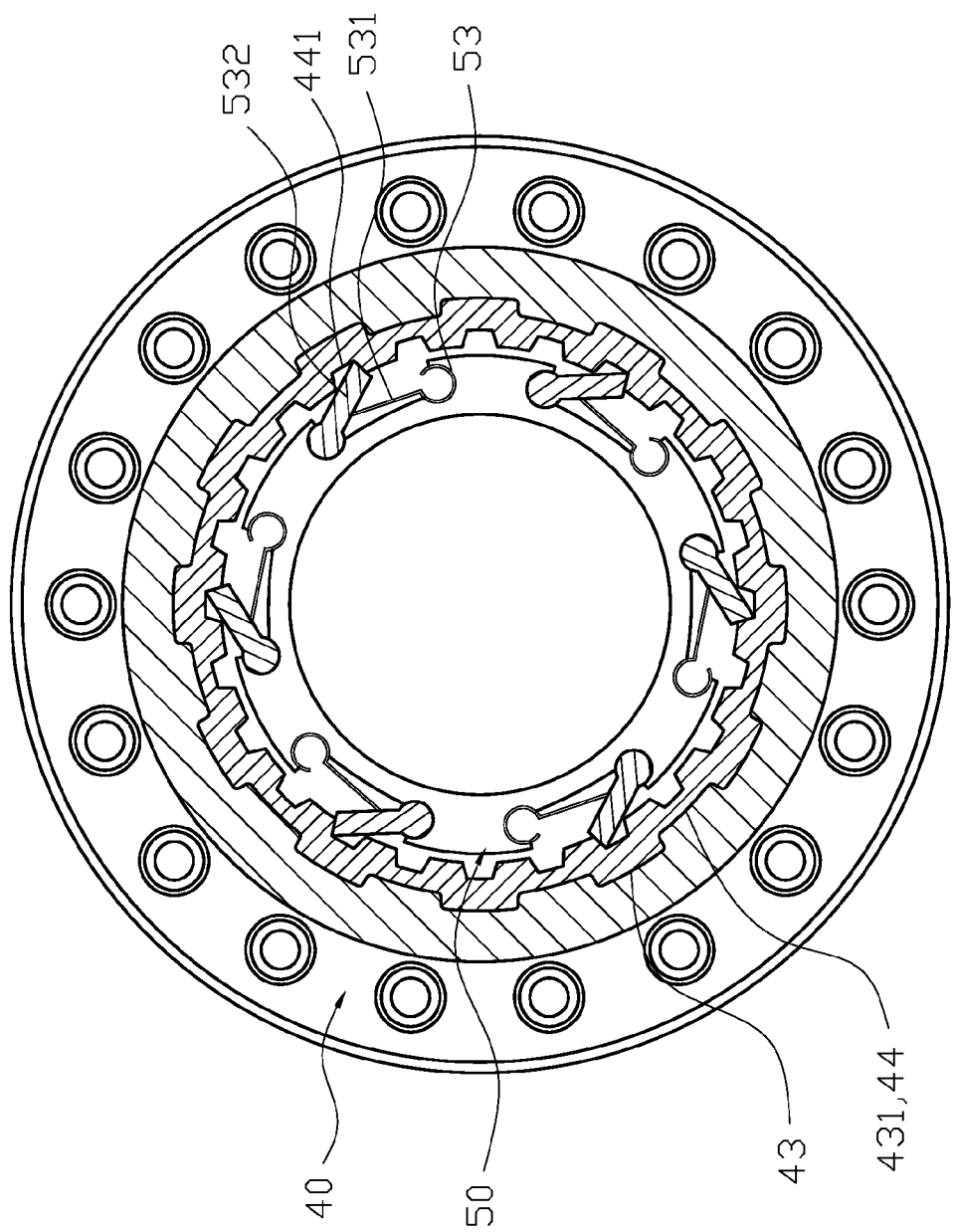
FIG. 16 is a sectional view of a prior art.

Referring to FIGS. 13 and 14 for another embodiment of the present invention, a locking section (15) extends from the other end of the hub shell (10) to provide the user to lock a freewheel (16) with different number of teeth, so that the user experiences different transmission effects when pedaling the bicycle, and the applicability and practicability of the hub shell are improved.

According to the structure shown in the embodiments, the present invention has the following advantages: (a) By switching the chain from one side to the other, the present invention can be used in the bicycle with the chain on the left and right sides. Since the hook (225) is against the inclined helical surface (211) of the ratchet ring (21), the hook (225) has larger contact area to further reinforce the structure to increase the durability; (b) The ratchet ring (21) has the inclined helical surface (211) inclining to one direction, and the inclined helical surface (211) engages with the hook (225) of the ratchet base (22) to lower the contacting height of the inclined helical surface (211) and reduce the volume of the ratchet ring (21). Namely the swing magnitude of the hook (225) is reduced to increase its flexibility; (c) Since the fixed ring (121) and ratchet ring (21) are located between the stopping unit (132) and restricting unit (141), the axial sliding of the fixed ring (121) and the ratchet ring (21) can be prevented to reduce axial wear and collision, and further reduce the rotation resistance of the single-directional driving component (20) and increase its durability; (d) Since the hub shell (10) can be switched to either single-directional or dual-directional driving according to the user's desire, the applicability of the hub shell (10) is increased. Thus, the species of produces are lowered to reduce inventory and further achieve the goal of cost reduction; (e) The ratchet ring (21) and the hook (225) are made of steel materials to reinforce the structure.

Having described the invention by the description and illustrations above, it should be understood that these are exemplary of the invention and are not to be considered as limiting. Accordingly, the invention is not to be considered as limited by the foregoing description, but includes any equivalent

What is claimed is:

1. A driving apparatus for a rear hub of a bicycle comprising:
    a hub shell that has a receiving space formed at one side of the hub shell, and the receiving space having a shaft passing therethrough, wherein the shaft has a thread section provided for a locking unit, and a plurality of wedging slots located around an inner perimeter of the receiving space, and a fixed ring is configured to tightly engage with the wedging slots and has a plurality of wedging ribs located at an inner perimeter thereof, wherein a stopping edge and a wedging groove are formed inside and outside the wedging slots respectively, and the stopping edge is formed for a bearing that is passed through by the shaft, wherein a stopping unit is formed on the side of the bearing and used to secure the bearing and the wedging groove is provided for a restricting unit;
    said wedging ribs of said fixed ring adapted to allow switching from a single-directional driving component to a dual-directional driving component,
    said single-directional driving component and said dual-directional driving component alternately placed in said hub engaged with said wedging ribs of the fixed ring, the single-directional driving component having a ratchet ring and a ratchet base, wherein the ratchet ring has a plurality of single-directional inclined surfaces formed around an inner perimeter of the ratchet ring, while a plurality of engaging ribs are formed around an outside perimeter of the ratchet ring, and the engaging ribs are adapted to engage with the wedging ribs of the fixed ring of the hub shell, wherein the ratchet base has a through hole through the axial direction adapted to receive the shaft, and the ratchet base has a plurality of conjugating portions located around an outer perimeter at one end thereof, and a first conjugating slot is axially and recessedly formed on one of the conjugating portions, while a second conjugating slot that is facing the first conjugating slot is axially and recessedly formed on another conjugating portion, wherein the first conjugating slot receives a resilient unit and the second conjugating slot receives a hook, and the resilient unit contacts the inner portion of the hook and biases the hook against one of the plurality of inclined surfaces of the ratchet ring, wherein one end of the hook has a rotating portion, and the other end of the ratchet base has a tooth plate; and
    the dual-directional driving component has a penetrating hole adapted to receive the shaft, and one end of the dual-directional driving component having a plurality of conjugating ribs adapted to be engaged with the wedging ribs of the fixed ring of the hub shell, so that when the conjugating ribs of the dual-directional component are engaged with the wedging ribs and a second tooth plate on the other end of the dual-directional driving component rotates, the dual-directional driving component rotates a tire of the bicycle.

2. The driving apparatus for a rear hub of a bicycle of claim 1, wherein the fixed ring, the ratchet ring and the hook are made of steel materials.

3. The driving apparatus for a rear hub of a bicycle of claim 1, wherein the restricting unit of the hub shell is a C-shaped hook.

4. The driving apparatus for a rear hub of a bicycle of claim 1, wherein a plurality of tool holes are located around an inner perimeter of the ratchet ring of the single-directional driving component.

5. The driving apparatus for a rear hub of a bicycle of claim 1, wherein the first and second conjugating slots of the conjugating portion of the ratchet base are concave.

6. The driving apparatus for a rear hub of a bicycle of claim 1, wherein the resilient unit is located at the first conjugating slot and the hook is located at the second conjugating slot.

7. The driving apparatus for a rear hub of a bicycle of claim 1, wherein the resilient unit is located at the second conjugating slot and the hook is located at the first conjugating slot.

8. The driving apparatus for a rear hub of a bicycle of claim 1, wherein the resilient unit has an engaging portion extending to both ends to form a stopping end and a supporting end, wherein the stopping end is against the outer perimeter of the ratchet base, and the supporting end is against an inner portion of the hook.

9. The driving apparatus for a rear hub of a bicycle of claim 1, wherein one end of the hub shell extends to form a locking section.

* * * * *